(12) United States Patent
Richards

(10) Patent No.: US 6,950,217 B2
(45) Date of Patent: Sep. 27, 2005

(54) SPATIAL LIGHT MODULATORS HAVING PHOTO-DETECTORS FOR USE IN DISPLAY SYSTEMS

(75) Inventor: Peter Richards, Menlo Park, CA (US)

(73) Assignee: Reflectivity, Inc., Sunnyvale, CA (US)

( * ) Notice: Subject to any disclaimer, the term of this patent is extended or adjusted under 35 U.S.C. 154(b) by 0 days.

(21) Appl. No.: 10/751,145

(22) Filed: Jan. 2, 2004

(65) Prior Publication Data

US 2005/0146767 A1     Jul. 7, 2005

(51) Int. Cl.[7] .............................................. G02B 26/00
(52) U.S. Cl. ...................... 359/238; 359/239
(58) Field of Search .................. 359/238, 239, 359/245, 292, 298, 315, 449; 353/50, 85, 353/84; 348/743; 358/474

(56) References Cited

U.S. PATENT DOCUMENTS

| | | |
|---|---|---|
| 5,327,263 A | 7/1994 | Katagiri et al. |
| 5,481,118 A | 1/1996 | Tew |
| 5,831,601 A | 11/1998 | Vogeley et al. |
| 6,455,208 B1 | 9/2002 | Yamashiki et al. |
| 6,474,818 B1 | 11/2002 | Engle |
| 6,520,648 B2 | 2/2003 | Stark et al. |
| 6,566,723 B1 | 5/2003 | Vook et al. |
| 6,596,979 B2 | 7/2003 | Hou |
| 6,683,290 B2 | 1/2004 | Doherty |
| 2003/0179435 A1 | 9/2003 | Tomiya |

Primary Examiner—Scott J. Sugarman
Assistant Examiner—Richard Hanig
(74) Attorney, Agent, or Firm—Gregory R. Muir

(57) ABSTRACT

A spatial light modulator having a photo-detector for use in digital display systems is provided. The spatial light modulator modulates a light beam having multiple light components of different frequencies so as to produce color images. The photo-detector detects a component of the light beam and generates a timing signal. The timing signal is then used to synchronize the operation of the spatial light modulator with the sequence of incident light color components.

49 Claims, 3 Drawing Sheets

SPATIAL LIGHT MODULATORS HAVING PHOTO-DETECTORS FOR USE IN DISPLAY SYSTEMS

TECHNICAL FIELD OF THE INVENTION

The present invention is related generally to the art of display systems using field sequential color techniques to generate color images, and, more particularly, to techniques for synchronization of color fields and displayed data in display systems.

BACKGROUND OF THE INVENTION

In current digital display systems, field sequential color techniques are often used in producing color images. Light beams in a set of primary colors such as red, green and blue, are sequentially directed at a spatial light modulator during a particular time period, such as a video frame period or a fraction of a video frame period. Accordingly, image data corresponding to each color is sequentially loaded into the spatial light modulator so as to produce color images when the frequency with which the colors are cycles is high enough that the observer's eye cannot readily distinguish the individual color fields. The success of the color image production depends upon the synchronization of the timing of the primary color illumination and the loading of the corresponding image data onto the SLM.

An approach to such synchronization is the use of a photo-detector that detects the phase of a color wheel as shown in FIG. 1. Referring to FIG. 1, color wheel 24 comprises separate color segments, for example red, green and blue. Light source 20 projects a light beam through the color wheel and one or more optical elements (not shown) onto spatial light modulator 26, such as a LCD, LCOS or micromirror based spatial light modulator. As the color wheel rotates at a particular speed, the light beam sequentially illuminates the SLM with a sequence of colored light beams. The position of the color wheel is detected by photo-detector 22. For example, an index mark is made on the color wheel and rotated along with the color wheel. Through the detection of the color index mark by the photo-detector, the positions of the color segments and thus the timing of the color segments passing through the path of the light beam can be determined. Image data corresponding to the color of the illumination incident on the SLM are loaded into the spatial light modulator to produce the color image.

In order to precisely detect the timing of the respective colors, the position of the color index mark on the color wheel needs to be precisely determined, and the relative position of the photo-detector and the color wheel has to be secured. All these require extensive efforts in, for example, aligning the color index mark to the color wheel, and positioning the photo-detector properly.

Therefore, what is desired is a method and apparatus for synchronizing the color fields with the operations of the display system.

SUMMARY OF THE INVENTION

In an embodiment of the invention, a spatial light modulator used in a digital display system for producing a color image by modulating a light beam having a multiplicity of components of different frequencies is disclosed. The spatial light modulator comprises: a semiconductor substrate having a first photo-detector designated for detecting a first component of the multiplicity of components of the light beam and generating a timing signal according to which the spatial light modulator modulates the light beam.

In another embodiment of the invention, a spatial light modulator is provided. The spatial light modulator comprises: an array of micromirrors for reflecting a light beam into different directions; an array of electrodes and circuitry for actuating the micromirrors; and a photo-detector designated for detecting a component of the light beam with a particular frequency and generating a timing signal according to the detection for controlling the electrodes and circuitry.

In yet another embodiment of the invention, a projector is disclosed. The projector comprises: a light source; a collection lens that collects light from the light source and focusing the collected light onto a spatial light modulator, wherein the spatial light modulator further comprises: an array of micromirrors for reflecting light from the collection lens either away from or into a projection lens; an array of electrodes and circuitry for deforming the micromirrors; and a photo-detector designated for detecting a component of the incident light with a particular frequency and generating a timing signal according to the detection for controlling the electrodes and circuitry; and a projection lens positioned to collect the reflected light from the micromirrors and project the collected light onto a display target.

In yet another embodiment of the invention, a method for operating a spatial light modulator is disclosed. The method comprises: projecting a light beam onto the spatial light modulator through a collection lens; detecting a component of the light beam with a particular frequency exiting from the collection lens; generating a timing signal according to the detection; and controlling the spatial light modulator in modulating the light beam based on the timing signal.

In yet another embodiment of the invention, a display system is provided. The display system comprises: a light source; a collection lens that collects a light beam from the light source and focusing the collected light beam onto a spatial light modulator; the spatial light modulator that modulates the incident light beam; a photo-detector designated for detecting a component of the light beam with a particular frequency and generating a timing signal according to the detection for controlling the modulation of the spatial light modulator; and a projection lens for collecting the modulated light beam and projecting the collected light beam onto a display target.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

The present invention provides spatial light modulator having a photo-detector for use in digital display systems. The spatial light modulator modulates a light beam having multiple light components of different frequencies so as to produce color images. The photo-detector detects a component of the light beam and generates a timing signal. The timing signal is then used to synchronize the operation of the spatial light modulator with the sequence of incident light color components. The photo-detector can be fabricated on a semiconductor substrate on which an array of electrodes and circuitry can be formed. The semiconductor substrate may also have an array of micromirrors for reflecting the light beam. Rather than having the micromirror array, the semiconductor may be position proximate to a glass substrate having the micromirror array formed thereon for deforming the micromirrors. In addition, two or more photo-detectors can be provided. The two photo-detectors may be the same but at different locations for detecting transitions from one color to another color. The two photo-detectors may be different. Specifically, the two photo-detectors may have different spectral responses. The signals from the two photo-detectors are compared and then amplified for precise detection.

Figure 1:
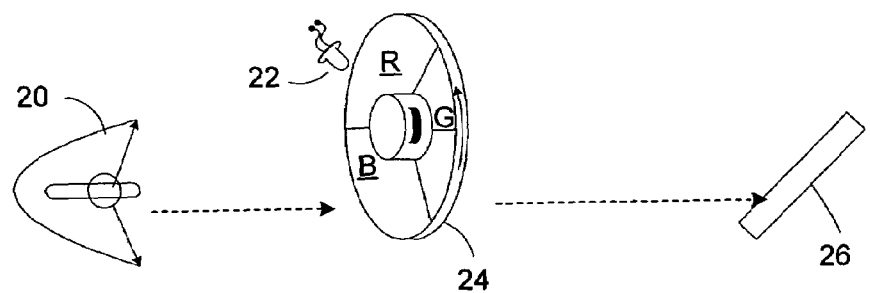
FIG. 1 illustrates a color wheel and a photo-detector in the art.
Figure 2:
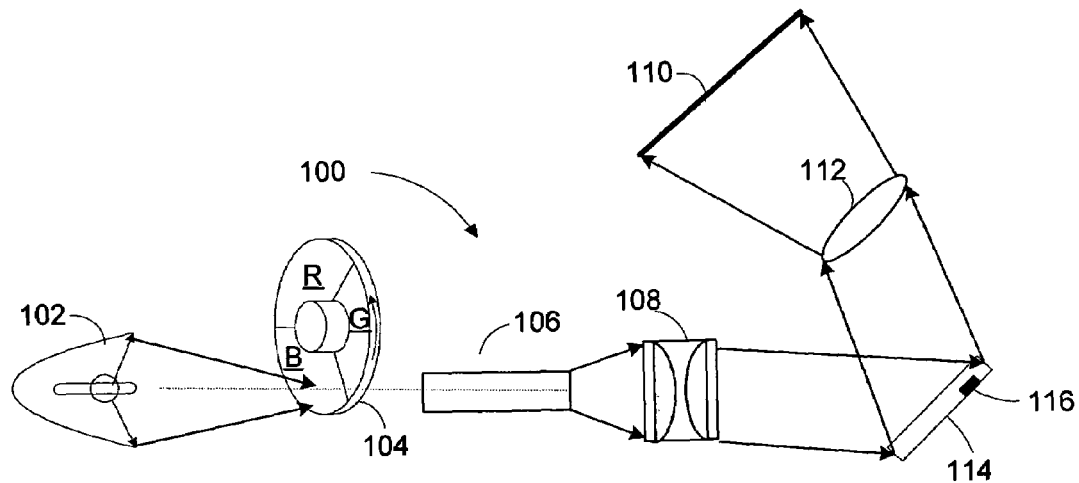
FIG. 2 illustrates an exemplary display system having a spatial light modulator in which embodiments of the invention can be implemented.

Referring to the drawings, FIG. 2 illustrates an exemplary display system having a spatial light modulator in which embodiments of the invention can be implemented. In its basic configuration, display system 100 comprises light source 102 providing a light beam for the display system. The light beam passes through color wheel 104 that comprises multiple color segments, such as red, blue and green. The color wheel in this figure is simplified for demonstration purposes only. In practice, a more complicated color wheel, such as a color wheel comprising red, blue, green and white segments is often employed. After the color wheel, monochromic light beams with different frequencies, such as red, blue and green light beams, are sequentially projected on spatial light modulator 114 through optical elements, such as light pipe 106 and collection lens 108. The spatial light modulator modulates the projected monochromatic light beams according to desired image data. The modulated light beams are collected and then projected to display target 110 through projection lens 112 so as to produce the desired images on the display target.

In modulating the monochromatic light beams, image data corresponding to the color segments are sequentially loaded to the spatial light modulator. The timing of loading the image data for a segment in the color wheel coincides with the propagation of the light beam passing through the segment. This synchronization is achieved through photo-detector 116 in spatial light modulator 114.

The photo-detector can be a diode fabricated in the semiconductor substrate using standard fabrication technology. Specifically a diode can be fabricated by doping a silicon substrate to form a p-type well which forms the diode's anode. In the p-type well, sections are doped as n-type so as to form the diode's cathode. The doping profiles, such as the type of the dopant, the density of the dopant and the envelope of the doping area and other factors determine the response (e.g. the output current or voltage) of the photo-detector to a light beam of a particular frequency. That is, response of the photo-detector can be varied by adjusting the doping profile.

In the following, the present invention will be illustrated in the following examples in which spatial light modulators having photo-detectors are based on micromirrors. It will be understood by those skilled in the art that the following discussion is for demonstration purposes only and should not be interpreted as a limitation. Rather, other variations without departing from the spirit of invention are also applicable.

Figure 3:
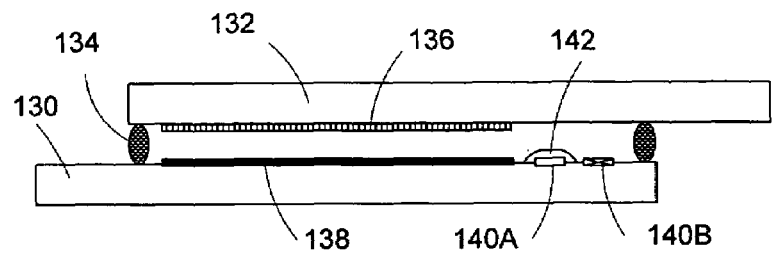
FIG. 3 illustrates a cross-sectional view of another exemplary spatial light modulator according to the invention.

Referring to FIG. 3, a cross-sectional view of an exemplary spatial light modulator is illustrated. The spatial light modulator comprises glass substrate 132 that is transmissive to visible light. Micromirror array 136 is formed on the glass substrate for reflecting the light beam into different directions. The micromirrors of the array are individually addressable and the reflection of the light beam is controlled by electrode and circuitry array 138 that is fabricated on semiconductor substrate 130. On the same semiconductor substrate 130 on which the electrodes are formed, photo-detector 140A is fabricated for detecting a component of the light beam of a particular frequency, such as the red (or green or blue) component of the light beam.

In operation, the photo-detector detects the occurrence of the light component of the particular frequency (e.g. red) and generates a timing signal. Occurrence of the remaining light components (e.g. green and blue) is derived from the timing of the light of the particular frequency according to the configuration of the color wheel and the rotation speed of the color wheel. In accordance with the timing signal and derived timings for the remaining light components, image data of different light components are sequentially loaded into the spatial light modulator so as to produce the desired image.

In general, a photo-detector may response to a light beam of a frequency range including the particular frequency. The strength of the response (e.g. the output current or voltage) varies with the light frequency. In an embodiment of the invention, the photo-detector presents a maximum response to the desired light component of the particular frequency. However, this is not always feasible, especially when the response to the desired light component (e.g. red) is so close to a response of another light component (e.g. blue) such that the two responses are not distinguishable. In this situation, color filtering film 142 can be disposed on the photo-detector for filtering the light components. Specifically, the color filtering component passes the desired light components (e.g. red color component) and blocks the rest color components (e.g. green and blue). According to the embodiment of the invention, the color filtering film can be a multilayered structure and comprises a dichroic filter designed for passing the desired color component and reflecting the remaining color components. The color filtering film can also be a dyed polymer such as polyimide.

The output current or voltage of the photo-detector is often small in amplitude. For this reason, the output response can be differentially amplified. For example, another photo-detector 140B is provided for detecting white light. The output responses of these two photo-detectors are amplified by a differential amplifier (not shown). The differentially amplified signal is then used as the timing signal for synchronizing the operation of the spatial light modulator. Photo-detector 140B can be fabricated in the same way as for photo-detector 140A in the semiconductor substrate but without a color filtering film.

In the exemplary spatial light modulator in FIG. 3, the micromirrors and the electrodes are formed on separate substrates 130 and 132, which are hermetically bonded using binding material 134. In another example, the micromirror array and the electrode array can be formed on the same semiconductor substrate, such as substrate 130. In this situation, the glass substrate 132 may not be provided.

Figure 4:
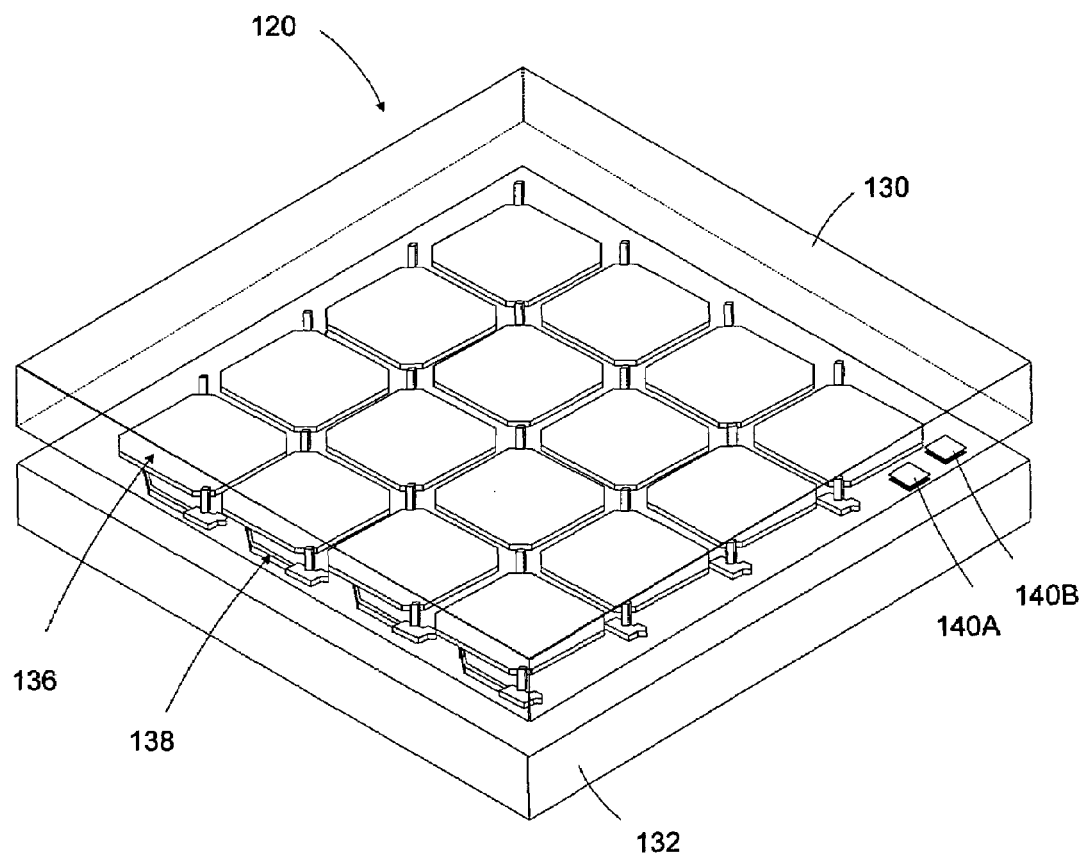
FIG. 4 illustrates a spatial light modulator comprising an array of micromirrors and a photo-detector.

The micromirrors of the micromirror array may take a variety of configurations as long as the micromirrors are individually addressable and are operable to deform so as to reflect the light beam into different directions. FIG. 4 illustrates a perspective view of a portion of a spatial light modulator having an array of micromirrors. Referring to FIG. 4, micromirror array 136 is formed on glass substrate 130 that is transmissive to visible light. Electrode array 138 is formed on semiconductor substrate 132 that is positioned proximate to the micromirrors so as to electrically deform the micromirrors. Photo-detector 140A is fabricated on the semiconductor substrate. Another photo-detector 140B may also be formed on the semiconductor substrate even though it is not required.

Figure 5:
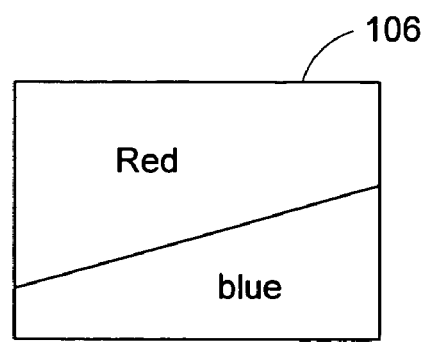
FIG. 5 illustrates two different colors shining on the spatial light modulator simultaneously.

In operation, image data of a color component (e.g. red) is desired to be loaded into the spatial light modulator when the color component is shining on the spatial light modulator. However, more than one color components can shine on the micromirrors simultaneously for a particular time period when a color segment is in transition to another in the rotating color wheel. As an example, red and blue segments are adjacent color segments in the color wheel in FIG. 2. As the color wheel rotates, blue and red light components sequentially sweep through the light exiting from light source 102 and the opening of light pipe 106. When the blue segments sweeps through the light path and the opening of the light pipe, image data for the blue color are loaded into the spatial light modulator for producing the blue counterpart of the image. Upon the termination of the blue light and the arrival of the red light, image data for the red light are loaded into the spatial light modulator for producing the red counterpart of the image. However, during the transition from the blue segment to the red segment in the rotating color wheel, both blue and red light will be collected by the opening of light pipe 106 as shown in FIG. 5, and eventually projected onto the spatial light—causing color mixture. To solve this problem, two photo-detectors can be provided for respectively detecting adjacent color components. For example, the two photo-detectors can be designated for respectively detecting the blue and red light, or red and green light, or green and blue light. The photo-detectors for different colors may be provided with different color filtering films associated with the desired colors. For example, the photo-detector for the red color can be provided with a color filtering film that passes the red light only, while the photo-detector for the blue color is provided with a color filtering film that passes the blue color only.

During the color transition, each photo-detector generates a separate timing signal upon arrival of the respective color. Image data of these colors can be loaded to the spatial light modulator according to the timing signals. For example, during the sweeping of the blue segment of the color wheel through the opening of the light pipe, image data for the blue color are loaded for generating the blue counterpart of the desired image. When the color transition starts and the red segment sweeps through the light beam, red and blue colors are simultaneously collected by the light pipe and projected on to the spatial light modulator. The arrival of the red light is detected by the associated photo-detector which generated a timing signal for the arrival of the red light. In accordance with the timing signal for the red light, image data for the red light are loaded so as to generate the red counterpart of the desired image. The same procedure may be applied to the transition from red to green, and from green to blue.

In a more complicated color wheel, such as a color wheel having more than 3 segments (e.g. a color wheel having multiple segment for each color, or one or more segments for white color) or a color wheel in which the color segments are configured into spirals, the method of the present invention are also applicable. Specifically, a photo-detector is provided and designated for detecting the arrival of a particular color. From the detection, the positions of each color segment on the color wheel can be derived according to the configuration of the color segments and the rotation speed of the color wheel.

Figure 6:
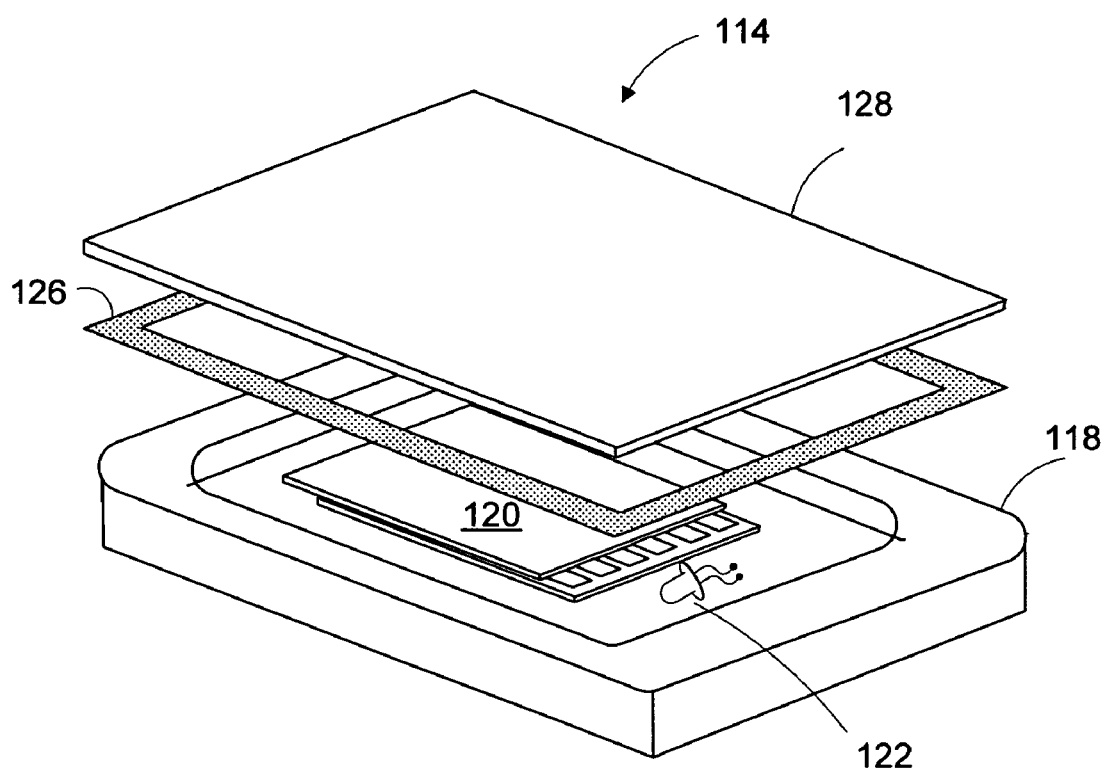
FIG. 6 illustrates a spatial light modulator on a package with a photo-detector disposed thereon.

Rather than fabricating the photo-detector in the semiconductor substrate having the electrode array and/or the micromirror array, the photo-detector can be disposed on a package substrate provide for packaging the spatial light modulator, as shown in FIG. 6. Referring to FIG. 6, spatial light modulator 120 is attached to package substrate 118 of package 114. Photo-detector 122 may also be disposed on the package substrate for detecting the desired color component and generating the timing signal. The package can be sealed by package cover 128 using sealing material 126 for protecting the spatial light modulator. As an example, the sealing material hermetically seals the package substrate and the package cover. When more than one photo-detector is provided, both photo-detectors can be disposed on the package substrate. Alternatively, one or more of the photo-detectors can be fabricated on the semiconductor substrate of the spatial light modulator, while the remaining photo-detectors can be disposed on the package substrate.

It will be appreciated by those of skill in the art that a new and useful method and apparatus for synchronizing the color wheel with the operation of the spatial light modulator have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

I claim:

1. A spatial light modulator used in a display system for producing a color image by modulating a light beam having a multiplicity of sequential components of different frequencies, the spatial light modulator comprising:
   a semiconductor substrate having a first photo-detector having a preferential spectral response to a first component of the multiplicity of components of the light beam and generating a timing signal according to which the spatial light modulator modulates the light beam.

2. The spatial light modulator of claim 1, wherein the semiconductor substrate further comprises:
   a second photo-detector having a preferential response to a second component of the multiplicity of components of the light beam and generating another timing signal.

3. The spatial light modulator of claim 2, wherein the first and the second photo-detectors are positioned at different locations.

4. The spatial light modulator of claim 1, wherein the first photo-detector comprises a color filtering film that passes the first component of the light beam and blocks the other components of the light beam.

5. The spatial light modulator of claim 3, wherein the color filtering film comprises a polyimide or dye or polymer.

6. The spatial light modulator of claim 3, wherein the color filtering film comprises a dichroic filter stack.

7. The spatial light modulator of claim 4, wherein the color filtering film comprises a plurality of optical layers of different optical properties.

8. The spatial light modulator of claim 3, wherein the semiconductor substrate further comprises:
a third photo-detector having a preferential spectral response to the light beam and generating a another timing signal; and
a differential amplifier in connection with the first and the third detectors for subtracting the timing signals from the first and third photo-detector and amplifying the difference between said timing signals.

9. The spatial light modulator of claim 4, wherein the timing signals from the first and third photo-detector co-exist during a particular time period.

10. The spatial light modulator of claim 1, wherein the semiconductor substrate further comprises:
an array of micromirrors for reflecting the light beam into different directions; and
an array of electrodes and circuitry for electrically deforming the micromirrors.

11. The spatial light modulator of claim 1, further comprising:
a glass substrate having an array of micromirrors formed thereon for reflecting the light beam into different directions; and
wherein the semiconductor substrate further comprises:
an array of electrodes and circuitry for electrically deforming the micromirrors of the array on the glass substrate.

12. The spatial light modulator of claim 11, wherein the semiconductor and glass substrates are bonded together.

13. A spatial light modulator, comprising:
an array of micromirrors for reflecting a light beam into different directions;
an array of electrodes and circuitry for deflecting the micromirrors; and
a photo-detector having a preferential spectral response to a component of the light beam with a particular frequency and generating a timing signal according to the detection for controlling the electrodes and circuitry.

14. The spatial light modulator of claim 13, wherein the array of the micromirrors is disposed on a substrate that is transmissive to visible light, and the array of electrode and circuitry are disposed on another substrate on which the photo-detector is disposed.

15. The spatial light modulator of claim 13, wherein the array of micromirrors, the array of electrode and circuitry and the photo-detector are disposed on the same substrate.

16. The spatial light modulator of claim 13, further comprising:
a package substrate on which the micromirror array, electrode and circuitry array and the photo-detector are placed.

17. The spatial light modulator of claim 16, further comprising: a package cover on the package substrate and hermetically sealed to the package substrate.

18. The spatial light modulator of claim 17, wherein the package cover is glass that is transmissive to visible light.

19. The spatial light modulator of claim 13, wherein the photo-detector further comprises: a color filtering film that passes the light component of the particular frequency and blocks other components of the incident light.

20. The spatial light modulator of claim 19, wherein the color filtering film comprises polyimide or dye or polymer.

21. The spatial light modulator of claim 19, wherein the color filtering film comprises a dichroic filter comprising multiple optical layers of different optical properties.

22. The spatial light modulator of claim 13, further comprising:
another photo-detector having a preferential spectral response different from that of the first photo-detector; and
a differential amplifier in connection to the photo-detectors to subtract the outputs of the photo-detectors and amplify a difference between the outputs.

23. The spatial light modulator of claim 13, further comprising:
another photo-detector;
wherein the incident light comprises a first and second component of different frequencies, the first and second components sequentially impinging the micromirror array;
wherein the photo-detector has a preferential spectral response to the first component of the incident light beam and generating a first timing signal corresponding to an arrival of the first component; and
wherein said another photo-detector has a preferential spectral response to the second component of the incident light generating a second timing signal corresponding to an arrival of the second component.

24. The spatial light modulator of claim 21, wherein the first and second timing signals co-exist during a particular time period.

25. A projector, comprising:
a light source;
a collection lens that collects light from the light source and focuses the collected light onto a spatial light modulator, wherein the spatial light modulator further comprises:
an array of micromirrors for reflecting light from the collection lens either away from or onto a projection lens;
an array of electrodes and circuitry for deflecting the micromirrors; and
a photo-detector having a preferential spectral response to a component of the incident light beam with a particular frequency and generating a timing signal according to the spectral response for controlling the electrodes and circuitry; and
a projection lens positioned to collect the reflected light from the micromirrors and project the collected light onto a display target.

26. The projector of claim 25, wherein the array of the micromirrors is disposed on a substrate that is transmissive to visible light, and the array of electrode and circuitry are disposed on another substrate on which the photo-detector is disposed.

27. The projector of claim 25, wherein the array of micromirrors, the array of electrode and circuitry and the photo-detector are disposed on the same substrate.

28. The projector of claim 25, further comprising:
a package substrate on which the micromirror array, electrode and circuitry array and the photo-detector are placed.

29. The projector of claim 28, further comprising: a package cover on the package substrate and hermetically sealed to the package substrate.

30. The projector of claim 29, wherein the package cover is glass that is transmissive to visible light.

31. The projector of claim 30, wherein the photo-detector further comprises: a color filtering film that passes the light component of the particular frequency and blocks other components of the incident light.

32. The projector of claim 31, wherein the color filtering film comprises polyimide or dye or polymer.

33. The projector of claim 31, wherein the color filtering film comprises a dichroic filter comprising multiple optical layers of different optical properties.

34. The projector of claim 25, further comprising:
another photo-detector having a preferential spectral response to all components of the incident light beam; and
a differential amplifier in connection to the photo-detectors to differentiate the responses of the photo-detectors and amplifies a difference between the detections.

35. The projector of claim 25, further comprising:
another photo-detector;
wherein the incident light comprises a first and second component of different frequencies, the first and second components sequentially impinging the micromirror array;
wherein the photo-detector has a preferential spectral response to the first component of the incident light beam and generating a first timing signal corresponding to an arrival of the first component; and
wherein said another photo-detector has a preferential spectral response to the second component of the incident light beam generating a second timing signal corresponding to an arrival of the second component.

36. The projector of claim 33, wherein the first and second timing signals co-exist during a particular time period.

37. A method for operating a spatial light modulator, comprising:
projecting a light beam onto the spatial light modulator through a collection lens;
detecting a component of the light beam with a particular frequency exiting from the collection lens;
generating a timing signal according to the detection; and
controlling the spatial light modulator in modulating the light beam based on the timing signal.

38. The method of claim 37, further comprising:
detecting another component of the light beam with another particular frequency; and
generating another timing signal.

39. The method of claim 38, further comprising:
subtracting the timing signals; and
amplifying the subtraction.

40. A display system, comprising:
a light source;
a collection lens that collects a light beam from the light source and focusing the collected light beam onto a spatial light modulator;
the spatial light modulator that modulates the incident light beam;
a photo-detector having a preferential spectral response to a component of the light beam with a particular frequency and generating a timing signal according to the response for controlling the modulation of the spatial light modulator; and
a projection lens for collecting the modulated light beam and projecting the collected light beam onto a display target.

41. The projector of claim 40, wherein the array of the micromirrors is disposed on a substrate that is transmissive to visible light, and the array of electrode and circuitry are disposed on another substrate on which the photo-detector is disposed.

42. The projector of claim 40, wherein the array of micromirrors, the array of electrode and circuitry and the photo-detector are disposed on the same substrate.

43. The projector of claim 40, further comprising:
a package substrate on which the micromirror array, electrode and circuitry array and the photo-detector are placed.

44. The projector of claim 40, wherein the photo-detector further comprises: a color filtering film that passes the light component of the particular frequency and blocks other components of the incident light.

45. The projector of claim 44, wherein the color filtering film comprises polyimide or dye or polymer.

46. The projector of claim 44, wherein the color filtering film comprises a dichroic filter comprising multiple optical layers of different optical properties.

47. The projector of claim 40, further comprising:
another photo-detector having a preferential spectral response to the incident light beam; and
a differential amplifier in connection to the photo-detectors to differentiate the detections of the photo-detectors and amplifies a difference between the detections.

48. The projector of claim 40, further comprising:
another photo-detector;
wherein the incident light comprises a first and second component of different frequencies, the first and second components sequentially impinging the micromirror array;
wherein the photo-detector has a preferential spectral response to the first component of the incident light and generating a first timing signal corresponding to an arrival of the first component; and
wherein said another photo-detector has a preferential spectral response to the second component of the incident light generating a second timing signal corresponding to an arrival of the second component.

49. The projector of claim 48, wherein the first timing signal and the second timing signal co-exist for a particular time period.

* * * * *